(No Model.) 3 Sheets—Sheet 3.
W. H. SMITH.
CORN HARVESTER AND HUSKER.
No. 575,860. Patented Jan. 26, 1897.
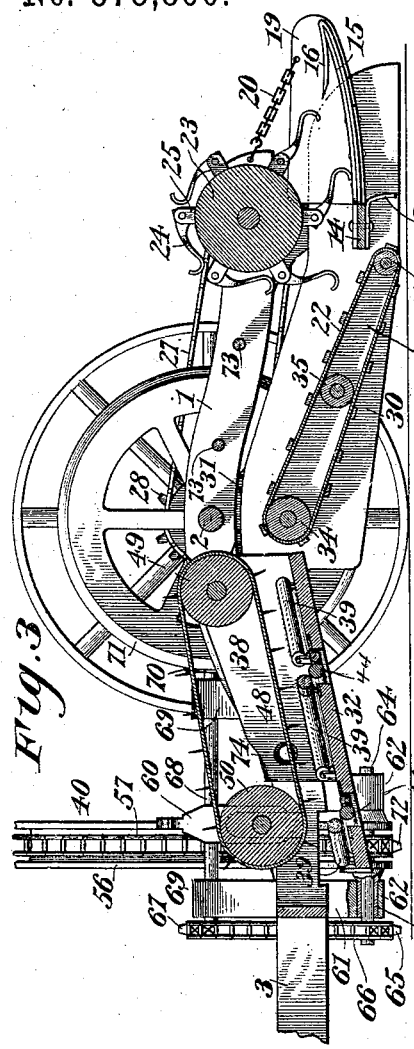
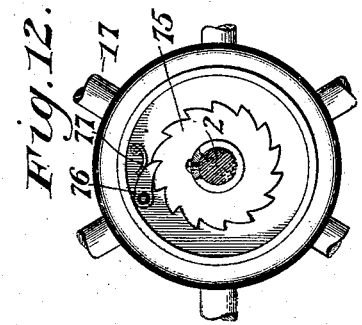
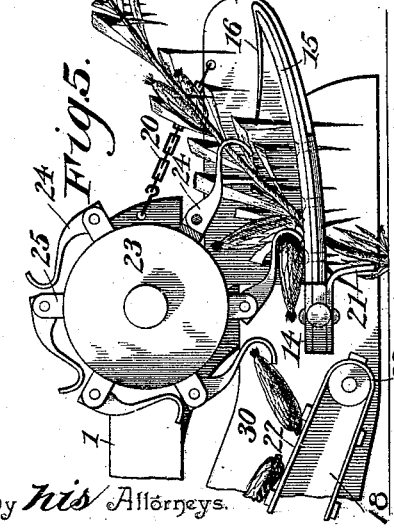
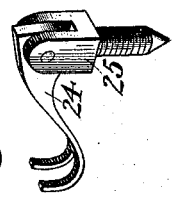
Witnesses
J. M. Witherow
V. B. Hillyard
Inventor,
Wm. H. Smith,
By his Attorneys.
C. A. Snow & Co.

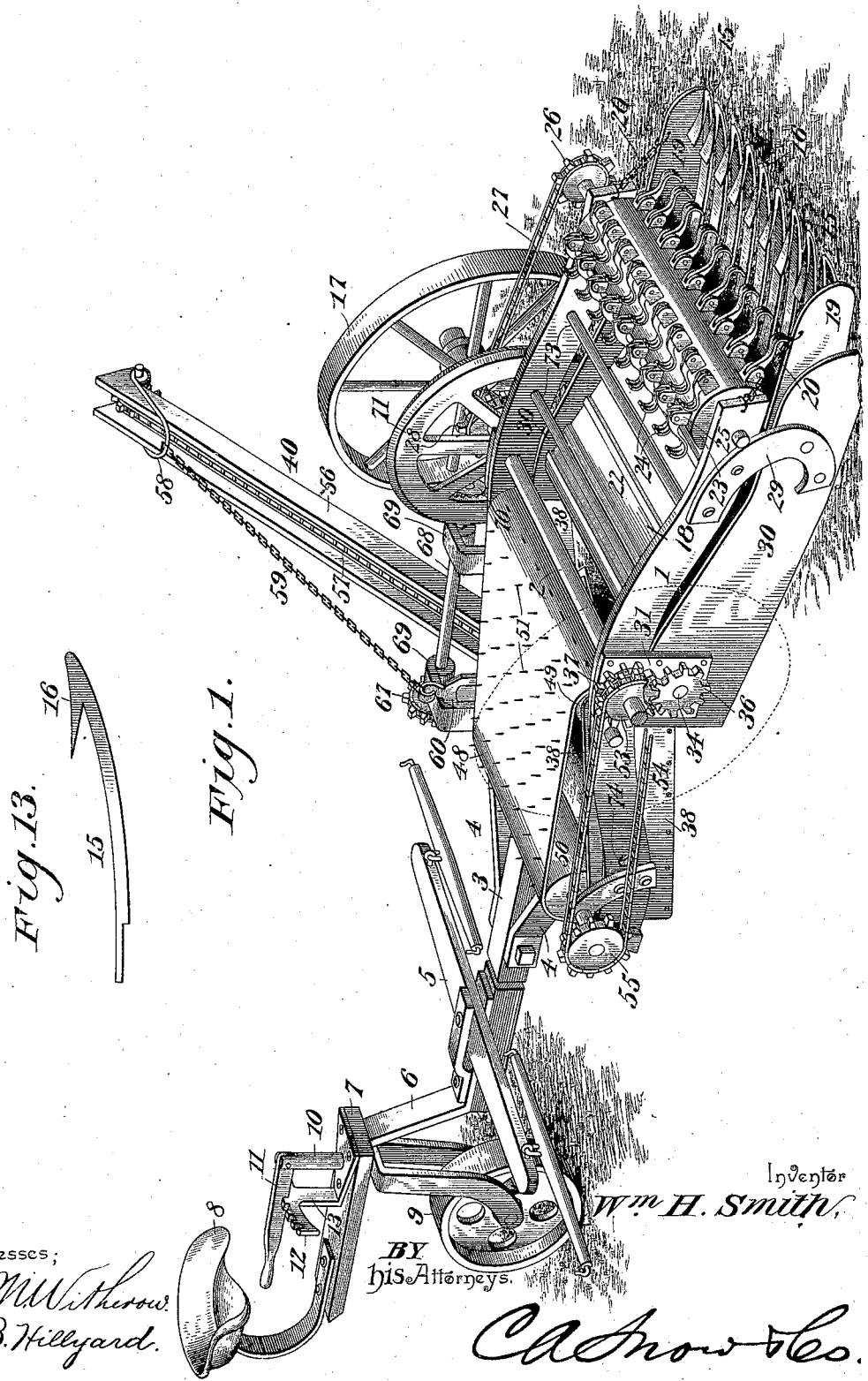

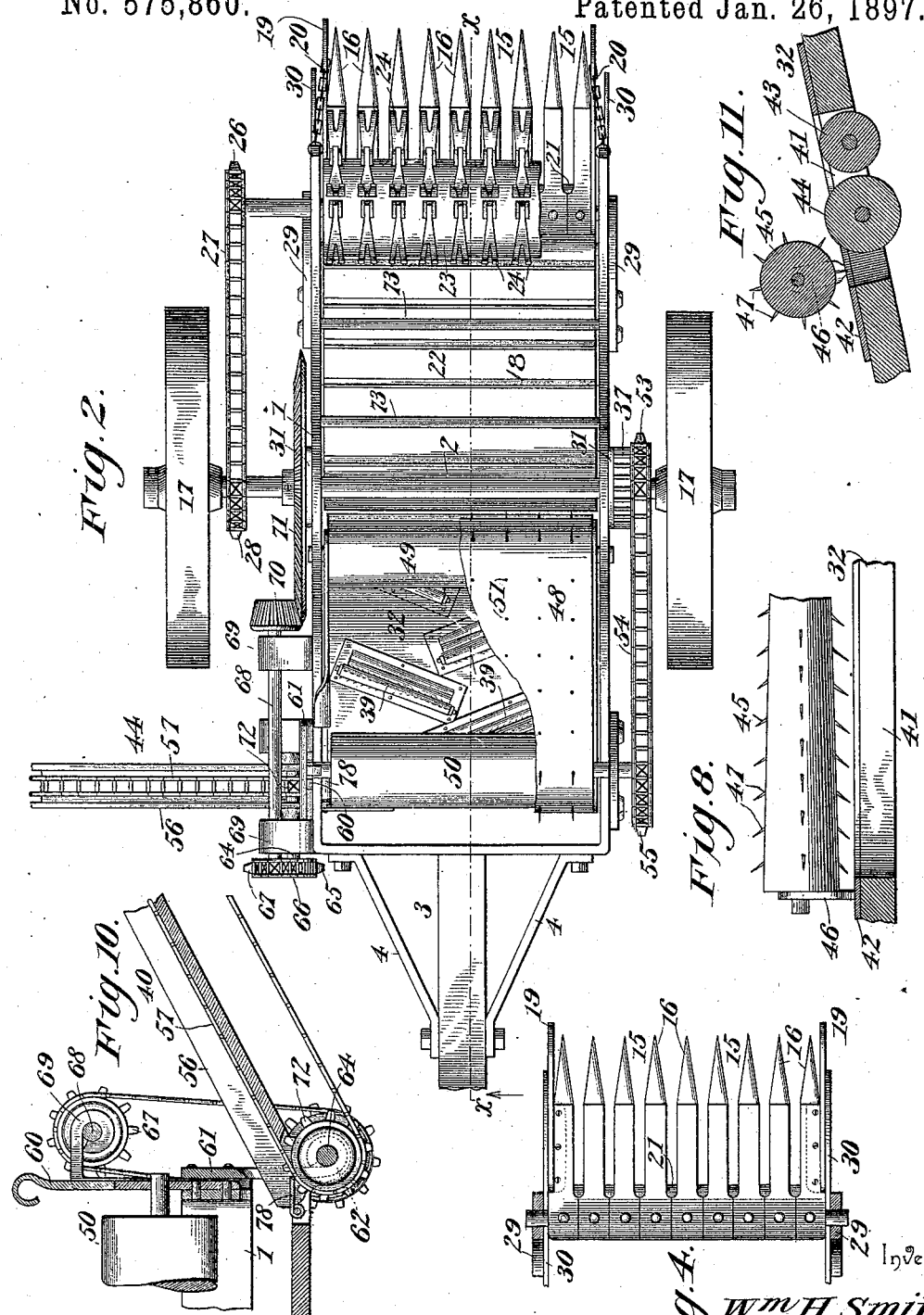

UNITED STATES PATENT OFFICE.

WILLIAM H. SMITH, OF WHITING, IOWA, ASSIGNOR OF ONE-HALF TO GEORGE A. OLSON, OF SAME PLACE.

CORN HARVESTER AND HUSKER.

SPECIFICATION forming part of Letters Patent No. 575,860, dated January 26, 1897.

Application filed April 20, 1895. Serial No. 546,523. (No model.)

*To all whom it may concern:*

Be it known that I, WILLIAM H. SMITH, a citizen of the United States, residing at Whiting, in the county of Monona and State of Iowa, have invented a new and useful Corn Harvester and Husker, of which the following is a specification.

This invention aims to provide a machine for stripping ears of corn from the stalks in the field, husking the same, and loading the ears of corn into a wagon, these several operations being performed at substantially the same time and in the field.

One important feature of the invention is the novel disposition of the stripping-fingers whereby downlying corn is gathered just as readily and with the same facility as ears of corn on standing stalks, the ears being stripped from the stalks, which latter are left in the field to be subsequently gathered for fodder or left standing for fertilizer or other desired purposes.

Another important feature of the improvement is the construction of a machine which will combine simplicity and efficiency and which will perform the required work in a rapid and satisfactory manner without working injury or detracting from the value of the harvested corn.

Other objects and advantages will appear from the following detailed description when taken in connection with the accompanying drawings, in which—

Figure 1 is a perspective view of a machine constructed in accordance with and embodying the essence of the invention. Fig. 2 is a top plan view of the machine, the outer portion of the pole or tongue and a portion of the husking-belt being broken away. Fig. 3 is a vertical longitudinal section on the line X X of Fig. 2, looking in the direction of the arrow. Fig. 4 is a detail view of the stripping mechanism detached. Fig. 5 is a detail view showing the manner of stripping the ears of corn from the stalks, the parts being shown on a larger scale. Fig. 6 is a detail view of a stripping-claw, showing the means whereby it has attachment to the carrying roller or cylinder. Fig. 7 is a top plan view of the husking-table, showing the relative disposition of the several husking devices or rollers. Fig. 8 is an enlarged view in detail of a toothed roller. Fig. 9 is an enlarged sectional view of a portion of the husking-belt, showing the construction and manner of securing the husking-teeth thereto. Fig. 10 is a detail view in section showing the mountings for attaching the side delivery elevator to the frame of the machine and the provisions whereby the said elevator is actuated. Fig. 11 is a cross-section of a set of husking-rollers, showing their relative location and proportionate size. Fig. 12 is a detail view showing the clutch mechanism between the ground-wheels and the supporting-axle. Fig. 13 is a detail view of a modified form of stripping-finger.

The frame 1 of the machine is substantially U-shaped, the side bars curving upward between their extremities and having the axle 2 journaled therein at the highest point. The pole or tongue 3 is attached to the closed end of the frame and extends rearwardly therefrom, being strengthened by braces 4 and having a doubletree 5 at its outer or rear end, to which the team is attached in the usual manner. A metal bar 6 is fastened to the rear end of the pole and has its rear end portion occurring in a higher plane and supporting a short beam 7, upon which is mounted the drivers's seat 8. An offset is formed in the metal bar 6 between its ends, whereby the rear end portion is brought into the higher plane. A caster or pilot wheel 9 is journaled in the short beam 7 by means of its shank 10 passing through the bar 6 and beam 7, the upper end of the shank being cleft and having pivoted thereto an operating-lever 11, which extends within convenient reach of the driver's seat to facilitate the steering of the machine independently of the team. A notched segment 12 is properly disposed to engage with the operating-lever 11 and hold the latter in the required position. This notched segment 12 has a shank portion 13, which is flattened at its lower end and bent so as to lie close upon the beam 7, to which it is attached in any desired manner. The shank 10 of the caster-wheel operates through the flattened portion of the shank 13 and serves, in conjunction with the fastenings by means of which the said shank 13 is held in place, to fix the position of the notched segment and prevent displacement thereof when subjected to severe strain.

The stripping mechanism is arranged at the front end of the machine and comprises a bar 14 and fingers 15, the latter being attached at their inner ends to the bar 14 and curving slightly in their length, the front ends of the fingers tapering to a point and having barbs 16 near their front ends to retain the ears of corn upon the fingers after being detached from the stalks until engaged by a claw 24, by means of which the said ears are dragged rearwardly and upon the carrier or elevator 18. These fingers 15 may be of any desired length and in practice will be about three feet between their extremities, and may be formed entirely of metal or wood, or a combination of the two, the latter being preferable because of the flexibility and the lightness and cheapness of construction. The wood found best for the construction of the fingers is hickory, the same being provided on the under side with a steel strip to provide a shoe for the fingers to travel upon when running on the ground. The barbs 16 are located near the front end of the fingers and curve upwardly a short distance, so as to hold the ears of corn upon the fingers until engaged by the claws, as herein stated. The barbs 16 may be formed by notching the wooden portion of the fingers or by the reentrant ends of the metal strips forming the runners, the latter construction being preferred for the sake of economy in construction and the ease and facility with which the said barbs may be obtained.

Side guards 19 are attached to the extreme fingers of the series and gradually widen from the front to the rear end and serve the purpose of holding the ears of corn upon the stripping-fingers from side displacement. These guards are thin metal plates and curve on their lower edges to approximate the outline of the lower side of the stripping-fingers, so as to run upon the ground and obviate entangling with stalks or other growths. The lower edge portion of the guards is bent inward to provide a flange which is riveted or otherwise secured to the extreme or side stripping-fingers. Short chains 20 connect the front portions of the guards with the frame of the machine and limit the downward movement of the stripping-fingers and prevent their ends from penetrating the ground and checking the progress of the machine. By lengthening or shortening these chains the distance of the front ends of the stripping-fingers above the ground can be regulated. A fender 21 is attached to the bar 14 and prevents injury to the lower or front end of the carrier or elevator 22, and consists of a plate bent between its edges into substantially an L shape, the horizontal portion being attached to the under side of the bar 14 and the vertical portion curving slightly to drag upon the ground and extend in front of the forward portion of the elevator 22.

Located directly above the rear portion of the stripping mechanism is a contrivance which, for the sake of simplicity in the description, will be designated and referred to hereinafter as a "rake." This rake comprises a roller or cylinder 23, journaled at its ends in the front portions of the frame side bars, and claws 24, the latter being pivoted to studs 25, set into the said cylinder or roller. These claws 24 are provided in rows extending in parallel relation lengthwise of the roller or cylinder and in sufficient number to correspond with the relative location and number of the stripping-fingers, and are adapted in the operation of the machine to engage with the ears of corn and drag them from the stripping-fingers onto the carrier or elevator 22. The claws will be arranged in circles about the cylinder or roller, one for each stripping-finger, so as to insure a raking of the ears of corn from the said fingers onto the carrier or elevator. The claws are expanded at their free ends and are curved slightly away from the cylinder or roller to facilitate their engagement with the ears of corn in the working of the machine and embrace the sides of the stalks and assist materially in detaching the ears of corn therefrom. By having the claws pivotally connected with the cylinder or roller they will be thrown outward on the front side of their supporting cylinder or roller and will fold on the rear and top side of the said cylinder, so as to be out of the way when not required for active service and at the same time enabling the rake to occupy a comparatively low position with reference to the stripping mechanism. A sprocket-wheel 26 is mounted upon a journal of the rake and is connected by a sprocket-chain 27 with a corresponding sprocket-wheel 28 on the axle 2, whereby movement is imparted to the rake when the machine is performing work.

Bracket-arms 29 are secured to the side bars of the frame and have their front ends curved forwardly and downwardly to support the front ends of side plates 30 and receive the ends of the bar 14, which latter is mounted therein. The rear ends of the side plates 30 are attached to hangers 31 and terminate about on a line corresponding with the front end of the husking-table 32. A roller 33 is journaled at its ends in the side plates 30 immediately below the inner ends of the stripping-fingers, and a corresponding roller 34 is similarly journaled in the side plates and hangers 31 directly in front of the husking-table 32, these two rollers forming supports for an endless belt or apron, which constitutes the carrier or elevator 22. A roller 35 is located intermediate of the rollers 33 and 34, and is designed to prevent the sagging of the said apron at a middle point, and is journaled at its ends in the side plates 30. One journal of the roller 34 is extended and provided with a pinion 36, which meshes with a corresponding pinion 37 on the axle 2, by means of which motion is imparted to the elevator to operate the latter so as to carry the ears of corn from the stripping mechanism to the husking devices.

The husking-table 32 is located in the rear of the elevator 22 and inclines in an opposite direction, that is, rearwardly and downwardly from its front end. Side plates 38 are secured to the opposite edge portions of the husking-table, and are attached in any convenient manner to the side bars of the frame 1. The table 32 is provided with a series of husking devices 39 of similar construction and of graduated sizes, the front husking device being the smallest or shortest and the rear the longest and extending practically the full width of the table and inclining to the line of draft, so as to move the ears of corn from one side of the table to the other, where they will be taken up by an elevator 40 and loaded into a wagon or other receptacle suitably placed for the reception of the said ears. All of the husking devices 39 incline to the line of draft and are disposed in alternate series, whereby the ears of corn are caused to travel in a zigzag direction from one side of the table to the other to insure a thorough removal of the husk before loading the corn onto the wagon. The front husking device is the shortest and inclines, say, to the right. The next husking device is a little longer and inclines in an opposite direction, or to the left, the third husking device being a trifle shorter than the second and inclining in an opposite direction thereto and being approximately parallel with the first, and the fourth or last husking device being the longest and inclining in an opposite direction to the third and about parallel with the second. The second husking device comes opposite the space between the first and the third and the third opposite the space between the second and the fourth, ample room being provided between the several husking devices for the passage of the ears of corn from one to the other during the husking operation.

The number of the husking devices is immaterial so long as they are disposed substantially in the manner set forth.

The husking devices being of similar construction, a detailed description of one will be sufficient. An oblong opening 41 is provided in the husking-table corresponding to the respective position of each husking device and is surrounded by a frame 42, in which are journaled the husking-rollers 43, 44, and 45, which are disposed in parallel relation and gradually taper throughout their length in the same direction. The top surface of the roller 43 is approximately in the same plane as the upper side of the husking-table, so as to offer no obstruction to the free passage of the ears of corn. The upper surface of the roller 44 extends a short distance above the plane of the husking-table to allow for variations in the sizes of the ears and prevent slender ears of corn from wedging beneath the spiked or toothed roller 45. This roller 44 occupies a position in the rear of the roller 43, and the trough formed between the two rollers 43 and 44 serves to give direction to the ears of corn in their movement from one side of the husking-table to the other. The roller 45 is located above the husking-table and is journaled in bearings 46 and is provided with a series of teeth or spikes 47, which are pointed and incline in a direction away from the smaller end of the said roller. In the husking process these teeth or spikes engage with the husks and strip or tear the same from the ears of corn.

The teeth 47, inclining away from the smaller end of the husking-rollers, extend and point in an inverse direction to the forward movement of the ears of corn, and entering the husks prevent accidental disengagement and insure a firm connection being had between the teeth and the husks, thereby obviating the slipping and imperfect action resulting from having the teeth extending at right angles to the surface of the rollers.

By having the upper surface of the roller 44 slightly higher than the plane of the husking-table and above the top surface of the roller 43 it is enabled the better to support the ear of corn and relieve the husking-roller 45 of a great amount of strain, as it extends into the angular space which would otherwise be formed between the rollers 45 and 43. By thus disposing the rollers their active surfaces more nearly conform to the ear, and each performs its share of the work in supporting and guiding the ear across the table. The rollers 43 and 44 form in effect a roller-bed, which sustains the ear of corn against the action of the husking-belt 48 and the husking-roller 45, while these two elements coöperate to strip and tear the husks from the ears. The best results are attained by having the rollers of tapering form, as it is found that they will clear themselves more readily of the husks and move the ears across the husking-table more easily than if given any other form.

The husking-belt travels lengthwise of the husking-table, and the teeth 51 thereof, engaging with the ears of corn, rotate the latter against the rollers 45, and the teeth of these rollers, engaging with the husks, act jointly with the teeth of the husking-belt to strip the husks from the ears. The husking devices 39 incline to the line of draft to effect a lateral movement of the ears across the table, and they are alternately arranged, as shown, to cause the ears to travel back and forth across the table to insure all the husks being stripped therefrom and to equalize the tendency to crowd the husking-belt to one side or the other of the table. If the husking devices inclined all one way, the husking-belt would be moved to one side of the machine, but by inclining the alternate husking devices one way and the intermediate ones in the opposite direction the tendency of one set to crowd the husking-belt to one side is counteracted by the other. Hence the husking-belt runs freely over its supporting-pulleys.

The husking-belt 48 extends about the full width of the husking-table, and is supported at its ends upon rollers 49 and 50, which are located a proper distance above the husking-table and are suitably journaled upon the frame of the machine. This husking-belt is of stout and heavy material, so as to perform the required work in a satisfactory manner, and may be formed of leather or rubber fabric, the latter being the preferable material. This belt is provided at proper intervals with rows of pointed teeth 51, which are formed by means of steel rivets having enlarged heads and pressed through the material comprising the belt, washers 52 being placed upon the projecting ends of the rivets and held in place by swaging the projecting ends of the rivets in the ordinary manner, said ends being subsequently pointed to perform the required work. The fabric or material comprising the husking-belt is clamped between the heads of the rivets and the washers, said heads and washers providing sufficient surface to prevent said rivets from being pulled or wrenched from the said fabric. The teeth occur on the outer surface of the husking-belt, and are adapted to act in conjunction with the husking devices, and particularly the toothed husking-rollers 45, to strip or tear the husks from the ears of corn.

In the operation of the husking-belt the teeth 51 thereof engage with the husks of the ears of corn and revolve the latter against the toothed rollers 45, which latter being caused to revolve by engagement therewith of the rotating ears remove the husks by means of the teeth 47 penetrating the same and pulling or tearing the said husk from the ears. This will be readily understood when it is remembered that the endless husking-belt travels in a direction approximately at right angles to the length of the husking-rollers and that the teeth of the said husking-belt make positive engagement with the husks of the ears and rotate the latter lengthwise against the toothed rollers 45 and cause the same to rotate in an opposite direction to the travel of the husking-belt, thereby causing the husks to be stripped or torn from the ears substantially in the manner set forth. The ears of corn are partially shorn or divested of their husks by the foremost husking devices, and in passing from one set of husking devices to another the said ears have their position reversed, that is, changed end for end, which is occasioned by the teeth of the husking-belt engaging with the ends of the ears projecting beyond the extremities of the husking-rollers and tilting the said ears before they are fully disengaged from the said husking-rollers. Thus the projecting ends of the ears are carried forward, while the inner ears, still in engagement with the husking-rollers, are retarded, which operation results in the changing or reversing of the ears, as previously stated. The ears of corn have their position reversed as they leave each husking device operating thereon. Motion is imparted to the husking-belt from a sprocket-wheel 53 on the axle 2 and a sprocket-chain 54, passing around the said sprocket-wheel 53 and a corresponding sprocket-wheel 55 on a journal of the rear roller 50, which latter supports the rear portion of the husking-belt.

The side elevator 40 has pivotal connection with the frame of the machine at a point opposite the delivery end of the husking-table and the rear or last husking device of the series, and comprises a frame 56 and an endless carrier 57, passing around suitable rotary supports at each end of the frame. As shown, the endless carrier 57 is a sprocket-chain, and the rotary supports at the ends of the frame are sprocket-pinions. This elevator has pivotal connection with the frame of the machine, and is adapted to be raised and lowered at its outer end to adapt its elevation to the height of the wagon or receptacle into which the ears of corn are loaded. A bail 58 is provided at the outer end of the elevator 40, and a chain or cord 59 is attached at one end to the said bail, and its inner end is adjustably connected to a standard 60, rising from the frame and having a hook at its upper end to facilitate the engagement therewith of the chain or cord 59. By lengthening or shortening the chain 59, which is effected by means of the adjustable connection thereof with the standard 60, the outer end of the elevator 40 can be raised or lowered, as will be readily understood.

A U-shaped bracket 61 is attached to the frame and has bearings 62 at its lower end to receive tubular journals 63, projecting laterally from the sides of the elevator-frame 56, and which form the pivotal connection between the said elevator-frame 56 and the machine. A shaft 64 passes through the bearings 62 and is mounted in the tubular journals 63, and is provided on one end with a sprocket-wheel 65, which is connected by a sprocket-chain 66 with a corresponding sprocket-wheel 67 on the end of a shaft 68, journaled in brackets 69 and having a pinion 70 on its opposite end in mesh with a gear-wheel 71 on the axle 2, whereby motion is transmitted from the said axle to the shaft 64. The lower rotary support or sprocket-wheel 72 for the inner end of the endless carrier 57 is mounted upon the shaft 64 in such a manner as to rotate therewith and cause a corresponding movement of the said carrier 57 when the machine is in working condition. The side bars of the frame 1 are strengthened by transverse bars or rods 73, and will be provided in sufficient number to attain the desired results.

Openings 74 are provided in the side bars of the frame and the plates 38 at a point about opposite the last husking device of the series to admit of access to remove obstructing husks and corn in the event of the machine choking. A suitable instrument, such as a rod or the hand, may be thrust through the openings 74 to enable the obstructing parts to be loosened or removed.

The machine is advanced over the field by the team, which is hitched to the pole or tongue in the rear thereof, the said machine preceding the team and stripping the stalks of the ears of corn, so as to obviate injury which would result if the team was hitched in advance of the machine in the ordinary manner. The stalks pass between the stripping-fingers, which latter remove the ears of corn therefrom, said ears being delivered to the husking devices by means of the rake and the elevator 22 in the manner set forth. The husking devices operate in the manner herein described and remove the husks in a thorough and effectual manner and deliver the ears of corn to the elevator 40, by means of which the said ears are loaded into the wagon placed alongside of the machine and moving therewith in the ordinary manner.

It will thus be seen that a machine of the character set forth is simple and compact and that the parts are readily accessible for purposes of repair, cleaning, or observation to determine their condition. The husking devices operating in the manner set forth require a minimum expenditure of force to effect the desired result, thereby enabling the machine to be propelled with a comparatively light draft.

The machines will be provided in different sizes, so as to operate upon a single row of stalks or two or more, as may be required. Hence in adapting the invention to meet the various demands it is manifest that changes in the form, proportion, and the minor details of construction may be resorted to without departing from the principle or sacrificing any of the advantages of this invention.

The ratchet mechanism for connecting the supporting-wheels 17 to the axle 2 may be of any preferred construction, and, as shown, comprises a ratchet-wheel 75, secured to the axle 2, and a pawl 76, having pivotal connection at one end with the hub of the supporting-wheel and having its free end adapted to engage with the teeth of the ratchet-wheel 75, a spring 77 being provided to hold the said pawl in engagement with the teeth of the ratchet-wheel.

In order to prevent the formation of a space between the endless carrier 57 of the side elevator 40 and the adjacent portion of the husking-table, a pivoted wing 78 is provided to support the corn in its passage from the husking-table to the side elevator.

The stripping-finger shown in Fig. 13 is formed entirely of stout strong wood, and will be used in some classes of machines.

Having thus described the invention, what is claimed as new is—

1. In a corn harvester and husker, the combination of stripping-fingers, an upwardly-inclined elevator in the rear of the stripping-fingers having its receiving end lower than the rear end thereof, a revolving rake located above the rear end of the stripping-fingers and above the receiving end of the elevator and comprising pivoted claws to act jointly with the stripping-fingers to snap the ears of corn from the stalks and move them onto the elevator, and means for raising and lowering the front end of the stripping-fingers without moving the elevator or revolving rake, substantially as set forth.

2. In a corn-harvester, the combination with the stripping mechanism, of a revolving rake comprising a roller, or cylinder, and claws having pivotal connection with the said roller, or cylinder, and arranged to coöperate with the stripping mechanism and relieve the same of the ears of corn detached from the stalks, substantially as set forth.

3. The combination with a husking-table, and a toothed husking-belt operating thereover, of husking-rollers mounted upon the husking-table at an inclination to the line of travel of the husking-belt, which inclination departs slightly from a transverse position, whereby the ears are moved across the table simultaneously with the husking operation, substantially as described.

4. The combination with a husking-table, of a series of individual husking devices disposed in alternate relation and oppositely inclined, substantially as described for the purpose set forth.

5. The combination with a husking-table, of a series of individual husking devices of graduated length disposed in alternate relation and at different relative angles, substantially as described for the purpose set forth.

6. The combination with a husking-table, of a husking device comprising a series of three rollers arranged in substantially parallel relation, the rear, or third, roller being disposed in a higher plane than the other two and a toothed husking-belt to act jointly with the said rollers, substantially as set forth.

7. The combination with a husking-table, of a series of three husking-rollers, the front roller having its top surface about in the same plane as the top of the husking-table, the second roller having its upper surface in a higher plane than the said table-top, and the third roller being located entirely above the plane of the table and a toothed husking-belt to act jointly with the said rollers, substantially as set forth.

8. The combination with a husking-table, of a series of three husking-rollers disposed in parallel relation and tapering throughout their length in the same direction, the rear, or last, husking-roller being located in a higher plane than the other two rollers and a toothed husking-belt to act jointly with the said rollers, substantially as set forth.

9. The combination with a husking-table, and a husking-belt, of a husking-roller inclining to the line of travel of the husking-belt and having teeth inclining away from the delivery end of the husking-roller, substantially as and for the purpose described.

10. The combination with a husking-table provided with a series of individual husking devices of varying length and disposed in alternate relation and at different relative angles, each husking device comprising a series of three tapering rollers placed in parallel relation, the third, or rear, roller occupying a position above the table-top and having teeth, of a husking-belt having a series of teeth and adapted to coöperate with the said husking devices to divest the ears of corn of the husks, substantially as set forth.

11. In a corn harvester and husker, the combination of a stripping mechanism, an upwardly and rearwardly inclined elevator in the rear of the stripping mechanism, a rake adapted to move the ears of corn from the stripping mechanism onto the said elevator and comprising a roller having pivoted claws, a downwardly and rearwardly inclined husking-table to receive the ears of corn from the elevator, and provided with husking devices, and an elevator to receive the ears of corn after they have been cut and load the same into a wagon or receptacle, substantially in the manner set forth.

In testimony that I claim the foregoing as my own I have hereto affixed my signature in the presence of two witnesses.

WILLIAM H. SMITH.

Witnesses:
E. A. SMITH,
JOHN DUNDON.